Patented May 10, 1932

1,857,143

UNITED STATES PATENT OFFICE

CHARLES DIETRICHS, OF LITTLE FERRY, NEW JERSEY, ASSIGNOR TO WALKER CEMENT PRODUCTS, INC., OF UNION CITY, NEW JERSEY, A CORPORATION OF NEW JERSEY

DRAINING TILE

No Drawing. Original application filed April 23, 1926, Serial No. 104,046. Divided and this application filed April 20, 1928. Serial No. 271,645.

This invention relates to porous cement pipes and has for its object to provide a pipe of this kind which shall have sufficient porosity to readily absorb moisture from the surrounding soil and carry it away rapidly and efficiently, and shall nevertheless have a tensile strength fairly comparable with ordinary non-porous cement pipes.

Porous cement pipes for drainage purpose have been on the market for some years. Such pipes are composed of cement and small crushed stone but without sand and with the cement in such proportion to the crushed stone as not to completely fill the interstices, vacancies and gaps between the stones. Such pipe, of course, has not the tensile strength of pipe made of a properly proportioned cement formula, but is exceedingly porous and has found favor as a substitute for perforated drain pipe. Due to the fragile nature of the porous pipe of this character it must be carefully handled during the making as well as when finished,—also the breakage is considerable so that the cost of manufacture and distribution is higher compared with ordinary non-porous cement pipe.

According to my present invention, instead of making up the composition for the pipe of cement and aggregate only, I mix with the cement an amount of sand which with the cement is still insufficient to fill the voids in the aggregate in the manner necessary to produce a dense concrete. I have found that pipe made in this manner possesses a high degree of porosity substantially equal in effect to the pipe heretofore made with aggregate and cement alone, and at the same time possesses a tensile strength much greater than pipe without the sand. In fact, the tensile strength of my improved pipe is such that it may be laid and handled in all respects like ordinary non-porous pipe.

I may also add to the tensile strength of the pipe without materially lessening its porosity by adding to the mixture a small amount of cocoanut fibre; for example, a mixture composed of one part cement, one part sand, six parts crushed stone and two parts cocoanut fibre produces an excellent pipe which is highly porous and of good tensile strength, particularly when the cement is wet. This feature of my improved pipe greatly facilitates the making of pipe as it may be handled without leaving it long in the molds.

The same mixture may be employed without the cocoanut fibre with results much better than can be obtained when the sand is not used. The proportions of the ingredients may, however, be varied within reasonable limits and the above formulas are to be regarded merely as typical.

This application is a division of my prior application, Ser. No. 104,046, filed April 23, 1926, which became Patent 1,782,412 on Nov. 25, 1930.

I claim:—

1. A porous concrete pipe for drainage and the like, which comprises a relatively coarse aggregate material and sand bound together by cement, said constituents being so proportioned that there is sufficient sand to assist in binding the aggregate together, but not sufficient to fill the voids between the aggregate.

2. A porous concrete pipe for drainage and the like, which comprises a relatively coarse aggregate material, sand and fibrous material bound together by cement, said constituents being so proportioned that there is sufficient sand to assist in binding the aggregate together, but not sufficient to fill the voids between the aggregate.

3. A porous aggregate which comprises a relatively coarse aggregate material and sand bound together by cement, said constituents being so proportioned that there is sufficient sand to assist in binding the aggregate together, but not sufficient to fill the voids between the aggregate.

In testimony whereof I affix my signature.

CHARLES DIETRICHS.